US005940113A

United States Patent [19]

Wilson

[11] Patent Number: 5,940,113

[45] Date of Patent: Aug. 17, 1999

[54] LENSLESS PRINTING SYSTEM WITH A LIGHT BAR PRINTHEAD

[75] Inventor: James M. Wilson, Glendora, Calif.

[73] Assignee: Xerox Corporation, Stamford, Conn.

[21] Appl. No.: 08/882,651

[22] Filed: Jun. 25, 1997

Related U.S. Application Data

[63] Continuation-in-part of application No. 08/358,502, Dec. 19, 1994, abandoned.

[51] Int. Cl.[6] ................................ B41J 2/47; H04N 1/40

[52] U.S. Cl. ............................................ 347/238; 347/241

[58] Field of Search ..................................... 347/238, 241

[56] References Cited

U.S. PATENT DOCUMENTS 5,517,328 5/1996 Wilson .................................... 347/241
5,818,488 10/1998 Tanuma et al. ......................... 347/240

FOREIGN PATENT DOCUMENTS 60-229081 11/1985 Japan .
405069591 3/1993 Japan ..................................... 347/238
8-072306 3/1996 Japan .

*Primary Examiner*—N. Le
*Assistant Examiner*—Lamson D. Nguyen
*Attorney, Agent, or Firm*—Fariba Rad

[57] ABSTRACT

There is disclosed a printing system in which an array of VCSELs as a light bar print head directly sends an array of light beams onto a photoreceptor without using an imaging optical element. In this invention VCSELs are selected to have a slowly diverging light beams. A photoreceptor is placed at a certain distance from the VCSELs where the light beam has a width equal to a desired spot corresponding to a given printing resolution.

6 Claims, 8 Drawing Sheets

FIG. 3 PRIOR ART
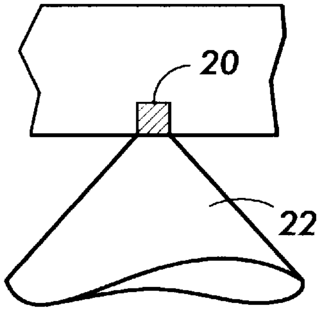
FIG. 4 PRIOR ART
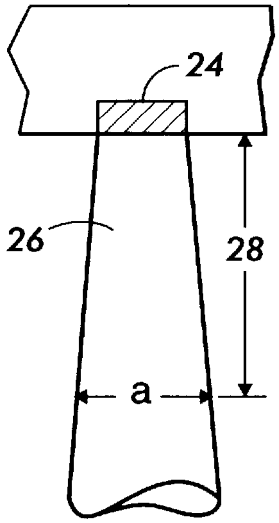
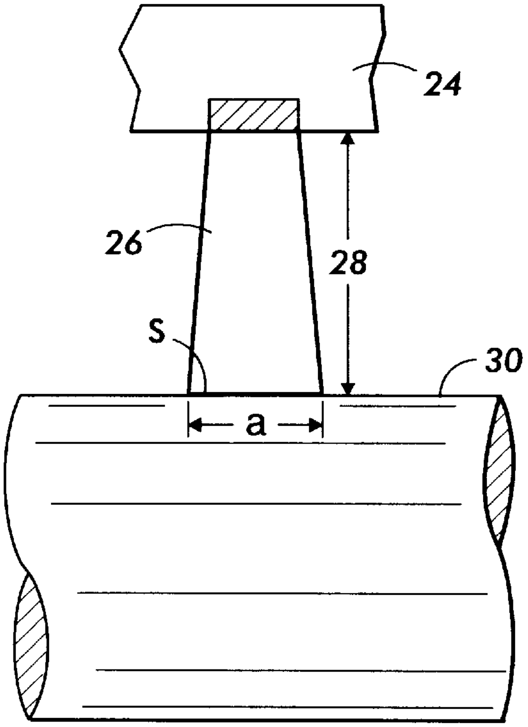
FIG. 5

LENSLESS PRINTING SYSTEM WITH A LIGHT BAR PRINTHEAD

This application is a continuation-in-part of U.S. patent application Ser. No. 08/358,502, filed Dec. 19, 1994, now abandoned.

BACKGROUND OF THE INVENTION

This invention relates to a printing system, and more particularly, t o a line printing system which is capable of simultaneously transferring all pixel information of one raster line or one text line through use of a vertical cavity surface emitting laser (VCSEL) array as a light bar print head without using an imaging optical element.

A light bar is an array of individual light emitting devices such as light emitting diode (LED) or electroluminescent (EL) edge emitters. For simplicity hereinafter, "light emitting devices" are called "light sources". Typically, a light bar array is utilized to produce an image on a photosensitive medium such as a xerographic photoreceptor used in a xerographic printer. In this kind of application, there is a need for a full width array of light sources, one per picture element or pixel, so that an array of light beams can be formed in such a manner that where they strike a photoreceptor, they generate a single line. Usually, this generated line on a photoreceptor of a scanning printing system is called a scan line. However, in this application since the line is not scanned and each individual light source is responsible to generate one pixel of the line on the photoreceptor, hereinafter, "the generated line on the photoreceptor" will be called "line of pixels".

Each light source is individually addressed. Therefore, by applying a certain voltage selectively to the light sources, the light sources emit light beams to selectively discharge the photoreceptor in order to generate line-by-line a latent image on the moving photoreceptor.

Conventional light bar printing systems require imaging optical elements to be positioned between the photosensitive medium and the light source array. Since the output beams of the light sources diverge very fast, there is a need to focus the light from the array sources onto the line of pixels on the surface of the photoreceptor by the imaging optical elements.

A conventional imaging optical element is a Selfoc lens array. A Selfoc lens array is an array of micro-lenses which will be placed between the light bar and the photoreceptor. Each micro-lens receives multiple light beams from multiple light sources and focuses each light beam from each light source onto one spot on the photoreceptor.

Referring to FIG. 1, there is shown a tangential or the fast scan view of an optical printing system 10 which utilizes a Selfoc lens and referring to FIG. 2, there is shown a sagittal or cross-scan view of the optical printing system 10. Referring to both FIGS. 1 and 2, a light bar 12 emits a plurality of light beams 14. A Selfoc lens 16, focuses each individual light beam onto an individual spot on the photoreceptor 18.

Typically, a Selfoc lens exhibits chromatic aberration problems which surface when used with a broad band emitter such as a EL edge emitter. In addition, a Selfoc lens is a significant contributor to output non-uniformity, short depth of focus, pixel placement errors and generally poor image quality.

Non-uniformity is caused by the fact that each micro-lens of a Selfoc lens array is an individual optical element and due to the manufacturing tolerances, each lens transmits the light beam in a different manner. Therefore, the light beam exiting each lens can have a different intensity causing an intensity non-uniformity over a line of pixels or it can be slightly deflected from the intended path causing a pixel placement error.

Also, due to the limitations and tolerances of the micro-lenses, the depth of focus of a Selfoc lens is very small. Depth of focus is the tolerance in which either the light source, the Selfoc lens or photoreceptor can have a positional error with respect to the other two without losing the focus. In other words, depth of focus is the tolerance of the spot size (i.e. spot size ±10%) to the positional errors of the optical elements. It is desirable to improve the depth of focus in order to maintain the focus on the photoreceptor while having positional errors between the optical elements.

In addition, some light sources emit light beams which have an elliptical cross section. This type of light beam is not suitable for printing systems using light bars since the spot created buy each light beam on the photoreceptor will be elliptical instead of circular and therefore, the pixel created by the elliptical spot will have an elliptical shape.

Considering the aforementioned problems, it is an object of this invention to eliminate the imaging optical element (typically a Selfoc lens) and provide generally circular pixels on a photoreceptor.

SUMMARY

In accordance with the present invention, there is disclosed a printing system which has a plurality of light emitting elements emitting a plurality of light beams along a path to a photoreceptor. The path consists of the plurality of light beams. Each one of the plurality of light beams on the path to the photoreceptor has a generally circular cross section and a Gaussian intensity distribution. Any two light emitting elements of the plurality of elements emitting light beams create two overlapping exposures and two adjacent pixels. Each one the two adjacent pixels is located within one of the exposures. The exposures' overlap occur in a range from one tenth (1/10) of maximum intensity of each light beam at time of exposure to nine tenths (9/10) of maximum intensity of each light beam at time of exposure. The plurality of light emitting elements being located at a given distance from said medium creating a generally circular pixel with a pixel size corresponding to a given printing resolution

BRIEF DESCRIPTION OF THE DRAWINGS

FIG. 3 shows a light beam being emitted from a small sized VCSEL;

FIG. 4 shows a light beam being emitted from a large sized VCSEL;

FIG. 5 shows a photoreceptor being placed at a certain distance from a large sized VCSEL in order to receive a required spot sized;

DESCRIPTION OF THE PREFERRED EMBODIMENT

Figure 1:
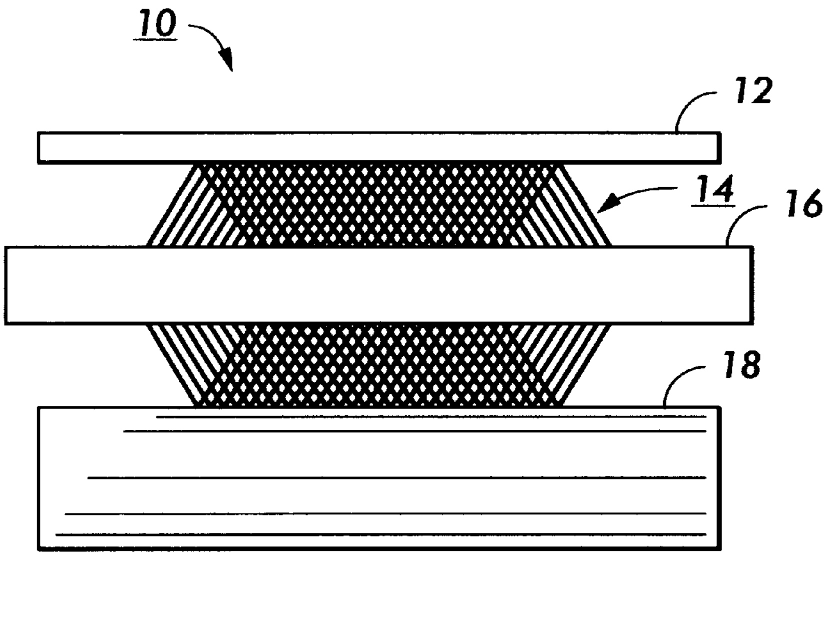
FIG. 1 PRIOR ART
FIG. 1 shows a fast scan view of a printing system which utilizes a Selfoc lens to image the light beams of a light bar onto a photoreceptor.
Figure 2:
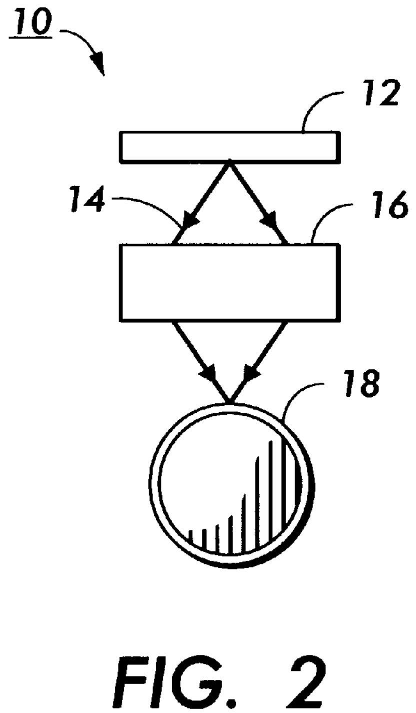
FIG. 2 PRIOR ART
FIG. 2 shows a cross scan view of a printing system which utilizes a Selfoc lens to image the light beams of a light bar onto a photoreceptor.

The proposed light bar print head of this invention utilizes vertical cavity surface emitting laser (VC SEL) array in order to eliminate the need for an imaging optical element (typically a Selfoc lens) and provide a generally circular pixel on the photoreceptor.

In order to comprehend the enclosed embodiment of this invention, it is necessary to study the characteristics of different size VCSELs. Small size VCSELs emit single mode light beams for any given input current applied to the VCSELs. A single mode light beam is a light beam with a Gaussian intensity distribution. However, large size VCSELs emit single mode light beams for currents below a given current applied to the VCSELs, and if the input current to the VCSELs is increased above the given current, they will start showing a problem known as multi-mode. Multimode is when a light beam loses its circular shape or it generates multiple spots or in general loses its Gaussian intensity distribution and generates a non-Gaussian intensity distribution. It should be noted that typically large size VCSELs if operated below their given currents and small size VCSELs operated at any current emit light beams that have generally circular cross sections.

Referring to FIG. 3, a small sized VCSEL 20 generates a fast diverging light beam 22. In comparison, referring to FIG. 4, a larger VCSEL 24 generates a light beam 26 which diverges very slowly.

It is a common practice to use small size VCSELs in order to avoid the multi-mode problem. On the contrary to the common practice, the enclosed embodiment of this invention utilizes large VCSELs. In spite of the fact that large VCSELs have a multi-mode problem at high output powers, they are quite stable and produce a single mode light beam at low output powers. Therefore, this invention utilizes large size VCSELs which will be operated at low output powers. In order to keep the output power of the VCSELs low, the VCSELs will be operated at a currents above their threshold current and below their given currents at which large diodes start entering into multi-mode. Threshold current is a current at which a VCSEL changes from non lasing emission to lasing emission.

It should be noted that in spite of the low output power of the VCSELs of this invention, the output power of each VCSEL is sufficient to discharge a pixel on the photoreceptor.

It should also be noted that another characteristic of the large VCSELs which produce slowly diverging light beam is that each VCSEL produces a light beam in which the Full Width of the light beam at Half of its Maximum intensity (FWHM) at the light source is greater than 2.5 micron in any direction on a plane which is generally perpendicular to the axis of the light beam.

Referring to FIG. 4, since the angle of divergence of the light beam emitted from a large VCSEL is very small, the width of the light beam gradually increases. As a result, for any desired spot size corresponding to a given printing resolution, the gradually increasing width of the light beam, at a certain distance from the VCSEL, will have a width equal to that desired spot size. For example, if the desired spot size on the photoreceptor is a, at distance 28 from the VCSEL 24, the width of the light beam will be equal to the spot size a. Therefore, referring to FIG. 5, if a photoreceptor 30 is placed at distance 28, the light beam 26 will generate a spot S with a spot size a on the photoreceptor 30. Thus, there will be no need for a selfoc lens.

In comparison, since the light beam from a small sized VCSEL diverges fast, a location at which the width of the light beam is equal to the desired spot size will be undesirably close to the photoreceptor which renders the use of small sized VCSELs impractical. In addition, the depth of focus of small sized VCSELs will be extremely small since a small movement along the path of the light beam changes the width of the light beam by a great magnitude. The extremely small depth of focus is another contributor to the impracticality of the small sized VCSELs.

However, since the light beam from a large sized VCSEL diverges slowly, a width equal to the desired spot size can be easily found. Also, since the light beam is slowly diverging, a small movement along the path of the light beam does not change the width of the light beam by far. Therefore, large sized VCSELs provide a better depth of focus.

Figure 7:
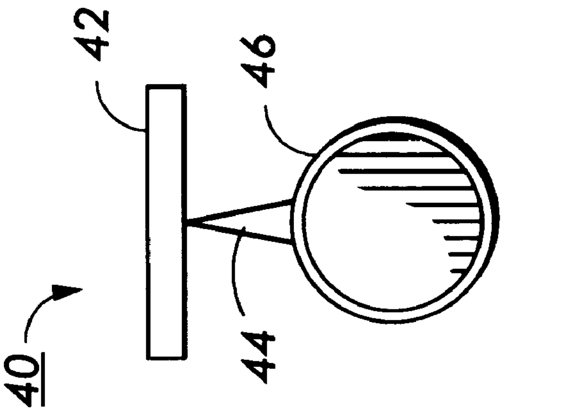
FIG. 7 shows a cross scan view of a printing system of this invention.
Figure 6:
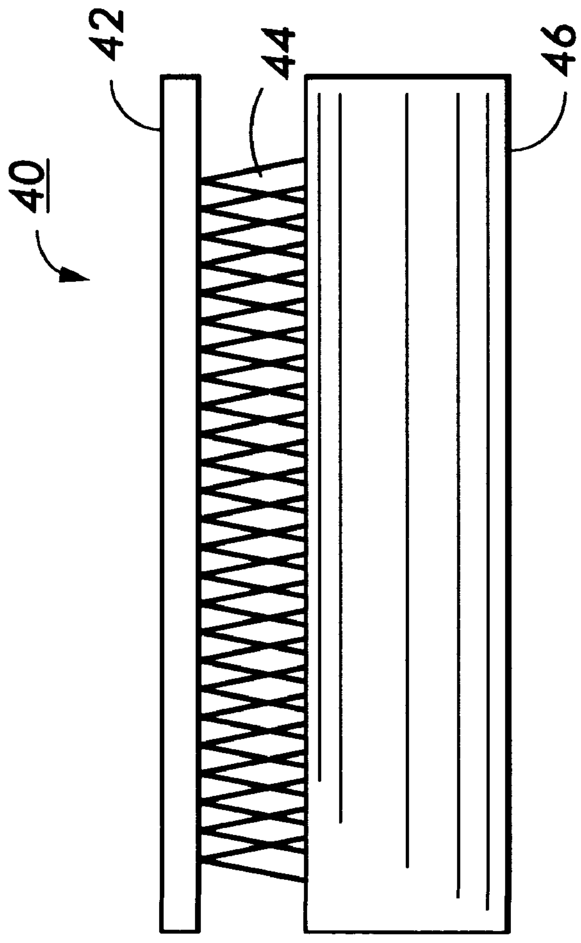
FIG. 6 shows a fast scan view of a printing system of this invention which utilizes a light bar and a photoreceptor which is placed at a certain distance from the light bar to receive the pixel information of one line from the light bar.

Referring to FIGS. 6 and 7, there are shown a tangential or fast scan view (FIG. 6) and a sagittal or cross scan view (FIG. 7) of the printing system 40 of this invention. In the printing system 40, a VCSEL array light bar 42 is utilized to image an array of light beams 44 onto a photoreceptor 46 without using an imaging optical element.

By eliminating the Selfoc lens, the chromatic aberration problems, the output non-uniformity, pixel placement errors will be eliminated and the depth of focus will be greatly improved.

Figure 8:
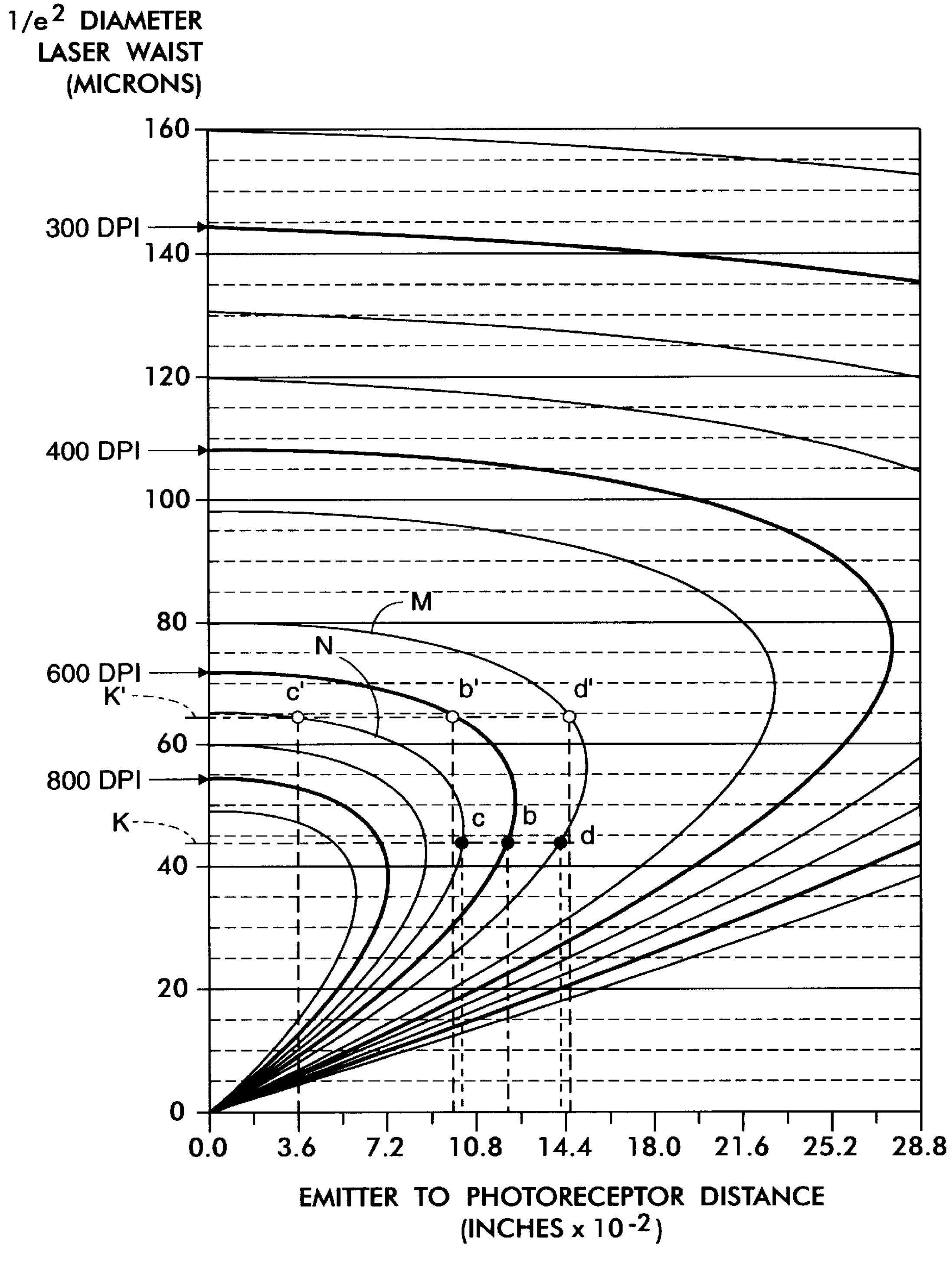
FIG. 8 shows a chart from which depending on the requirements of the printing system, the size of the required VCSEL, the distance that the photoreceptor should be placed from the VCSELs and the depth of focus can be determined.

Referring to FIG. 8, there is shown a chart from which depending on the requirements of the printing system, the size of a VCSEL, the distance that the photoreceptor should be placed from the VCSELs and the depth of focus can be determined. In FIG. 8, the vertical axis represents the size of the VCSEL (laser waist $1/e^2$ diameter) and the horizontal axis represents the required distance between the VCSEL and the photoreceptor.

For example, if the printing system is a 600 dots per inch system, then the curve shown by 600 DPI will be used to determine the distance between the VCSELs and the photoreceptor or the size of the VCSELs. If the VCSEL size is selected to be 44 microns, then the distance between the VCSELs and the photoreceptor can be determined by drawing a horizontal line K from point 44 on the vertical axis to cross the 600 DPI curve at point b. The distance from point b to the vertical axis determines the required distance between the VCSELs and the photoreceptor. In this example the distance from the VCSELs to the photoreceptor is equal to 0.121 inch. The depth of focus can also be determined by measuring the distance between point c and point d where the line K crosses curve N and curve M respectively. Curve N is the preceding curve and curve M is the succeeding curve to curve 600 DPI. In this example the depth of focus is 0.142–0.103 =0.039 inch.

Alternatively, in a 600 DPI printing system, if the VCSEL size is selected to be 65 microns, a horizontal line K' from point 77 on the vertical axis drawn to cross curve 600 DPI at point b' determines the distance from the VCSELs to the photoreceptor which in this example is equal to 0.1 inch. As it can be observed, if the VCSEL size is selected to be 65 microns, the depth of focus (the distance between points c' and d' ) will be equal to 0.147–0.036=0.111 inch which is larger than the depth of focus for the 44 micron VCSELs.

In this invention, depending on the requirements of the printing systems, the VCSEL size can be selected in such a manner to achieve a certain depth of focus or a certain distance between the VCSELs and the photoreceptor. In addition, the printing system of this invention provides an improved depth of focus. Referring back to the aforementioned examples, the depth of focus for a 44 micron VCSEL is 0.039 and the depth of focus for a 65 micron VCSEL is 0.111 inch. However, in a 600 dot per inch (DPI) printing system with a Selfoc lens, the depth of focus is in the range of 0.016 inch. Therefore, in this invention, not only the depth of focus can be modified by selecting a different size VCSEL but also the depth of focus is improved.

It should be noted that the chart shown in FIG. 8 is based on a VCSEL emitting a light beam with a 657 nm wavelength. For VCSELs with different wavelengths, different charts should be used.

It should also be noted that the printing system of this invention is more suitable for high resolution printing systems which require smaller spot sizes. The maximum desired spot size is at a printing resolution of 300 dot per inch.

Figure 9:
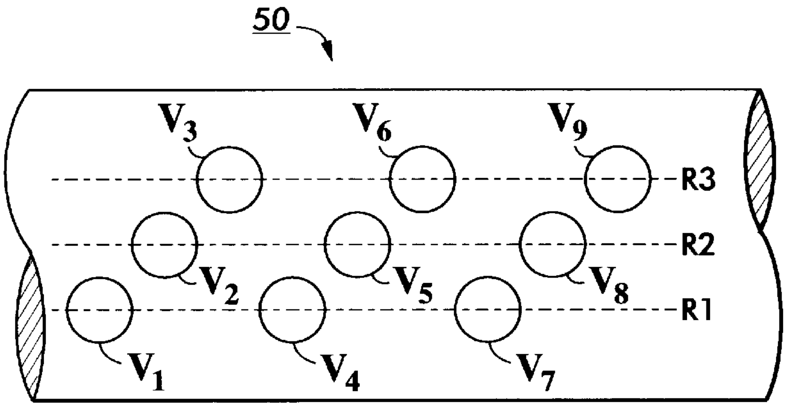
FIG. 9 shows the arrangement of the VCSELs in the preferred embodiment of this invention.

Referring to FIG. 9, there is shown the arrangement 50 of the VCSELs in the preferred embodiment of this invention. In the preferred embodiment of this invention, for the purpose of improving the VCSEL density, the VCSELs are staggered onto three rows $R_1$, $R_2$ and $R_3$. In high resolution printing systems due to a higher number of pixels, a higher number of VCSELs are needed. However, VCSELs can not be placed too close to each other.

Therefore, in order to have a high density of VCSELs in a limited space, the VCSELs can be staggered as shown in FIG. 9. The exposures from VCSELs in multiple rows are aligned in the tangential direction on the photoreceptor by delaying the emission of the light beam of the successive rows $R_2$ and $R_3$ relative to the first row $R_1$ until the photoreceptor has moved sufficiently for the pixel line to be exposed to the light beams from the rows $R_2$ and $R_3$ respectively.

Figure 10:
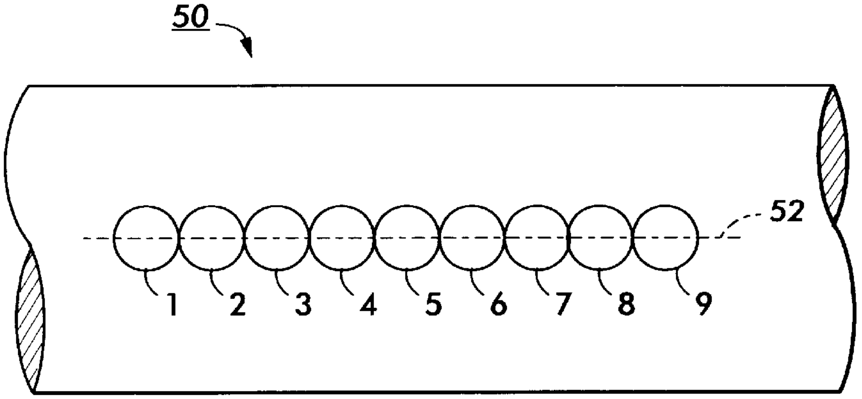
FIG. 10 shows pixels which were created by the light beams from FIG. 9.

In other words, VCSELs $V_1$, $V_4$ and $V_7$ of row $R_1$ will discharge pixels 1, 4 and 7 of a pixel line 52 of FIG. 10. Referring to FIG. 10, there is shown pixels 1–9 which are created by the light beams from VCSELs 1–9. Referring to Both FIGS. 9 and 10, as the photoreceptor moves, the same pixel line 52 moves in front of row $R_2$ at which time, VCSELs $V_2$, $V_5$ and $V_8$ start emitting and discharging pixels 2, 5 and 8 of the same pixel line 52. In the same manner, as the photoreceptor moves, the same pixel line 52 moves in front of row $R_3$ at which time, VCSELs $V_3$, $V_6$ and $V_9$ start emitting and discharging pixels 3, 6 and 9. Therefore, as the photoreceptor moves away from row $R_3$, pixels 1–9 of a same pixel line 52 are discharged.

Figure 11:
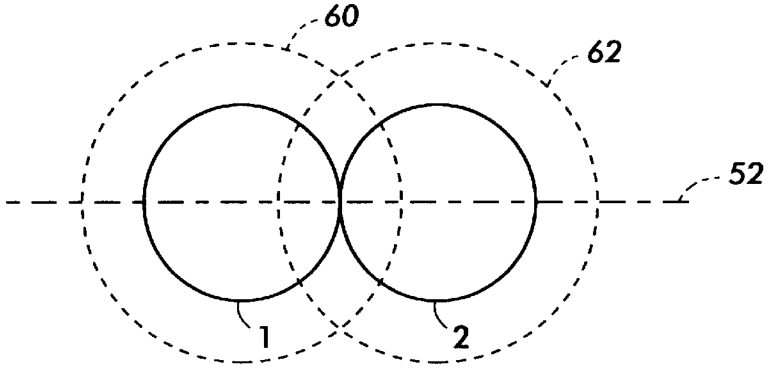
FIG. 11 shows that each two light beams that create two adjacent pixels create two overlapping exposures.

Referring to FIG. 11, where each light beam strikes the photoreceptor, the spot from the light beam creates an exposure such as exposure 60. Each two light beams that create two adjacent pixels, for example pixels 1 and 2, create two overlapping exposures such as 60 and 62 respectively on the same pixel line 52. Depending on the intensity level required to discharge the photoreceptor, only the portion of the light beam above that intensity level discharges the photoreceptor and creates a pixel.

Figure 12:
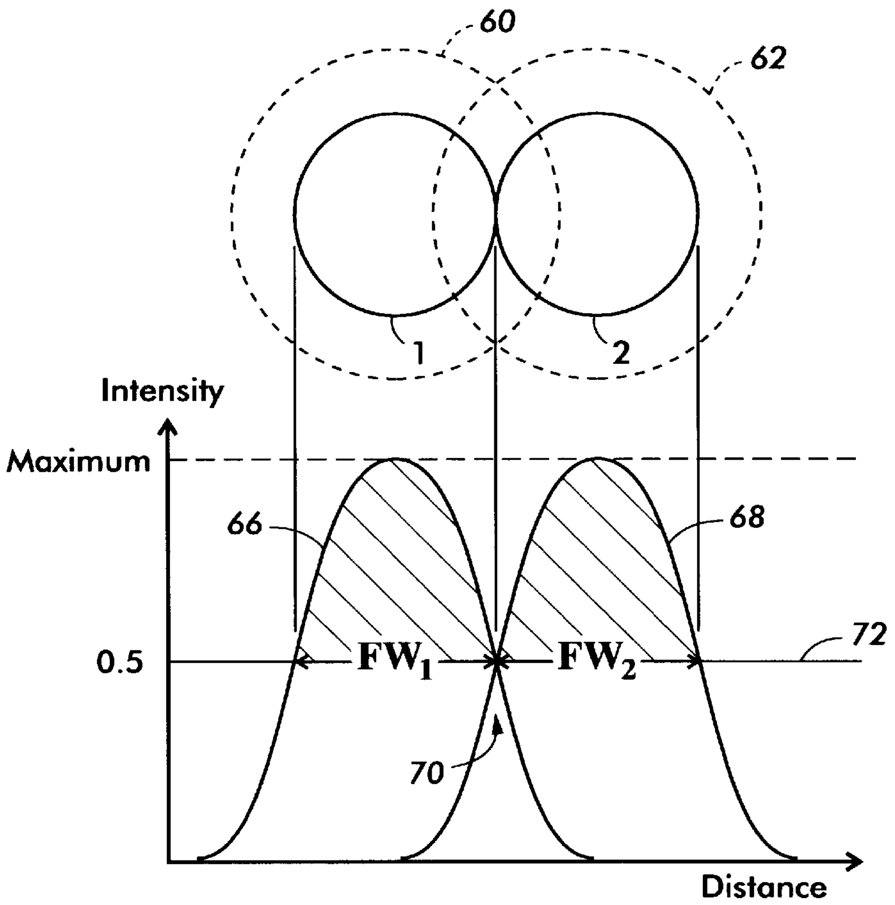
FIG. 12 shows the exposures of FIG. 11 along with the intensity distributions of each light beam that created each one the exposures of FIG. 11.

Referring to FIG. 12, there is shown the exposures 60 and 62 of FIG. 11 along with the intensity distributions 66 and 68 of each light beam that created each one the exposures 60 and 62 respectively. The overlap between the two intensity distributions (where the distributions cross each other) occurs at point 70 which is at half of the maximum intensity. The overlap of the exposures 60 and 62 is also defined by the overlap of the intensity distributions. Therefore, the two exposures' overlap occur at the half of the maximum intensity of each light beam at the time of exposure. It should be noted that all the light beams from all the VCSELs used in this invention have substantially the same intensity.

The full width $FW_1$ of the intensity distribution 66 at half the maximum intensity represents the size of pixel 1 within exposure 60 and the full width $FW_2$ of the intensity distribution 68 at half the maximum intensity represents the size of pixel 2 within exposure 62. It should be noted that since the intensity distribution of all the light beams from all the VCSELs are substantially the same, $FW_1$ and $FW_2$ are substantially equal. Pixels 1 and 2 are created by the portions **66*a* and 68*a*** which have intensity above the ½of maximum intensity. The amount of overlap between the exposures is selected in such a manner to create pixels with a size that matches the size of pixels of a required printer.

Figure 13:
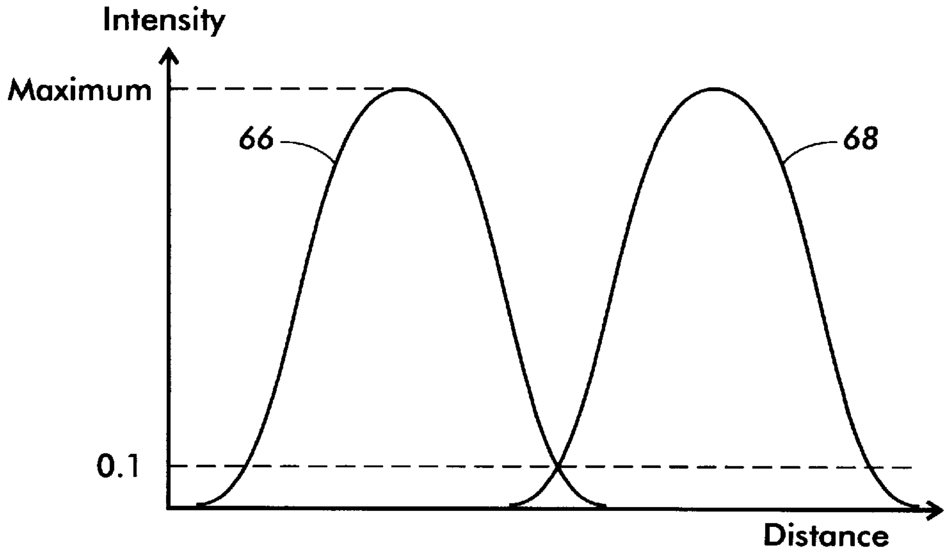
FIG. 13 shows the overlap between the intensity distributions of the two light beams creating two adjacent pixels occur at one tenth (1/10) of the maximum intensity.
Figure 14:
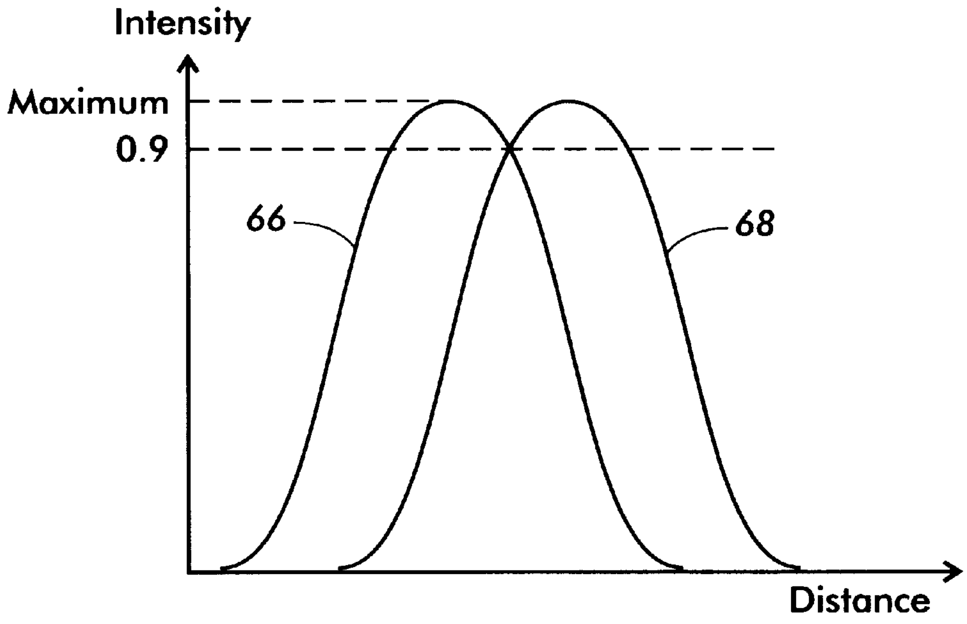
FIG. 14 shows the overlap between the intensity distributions of the two light beams creating two adjacent pixels occur at nine tenths (9/10) of the maximum intensity.
Figure 15:
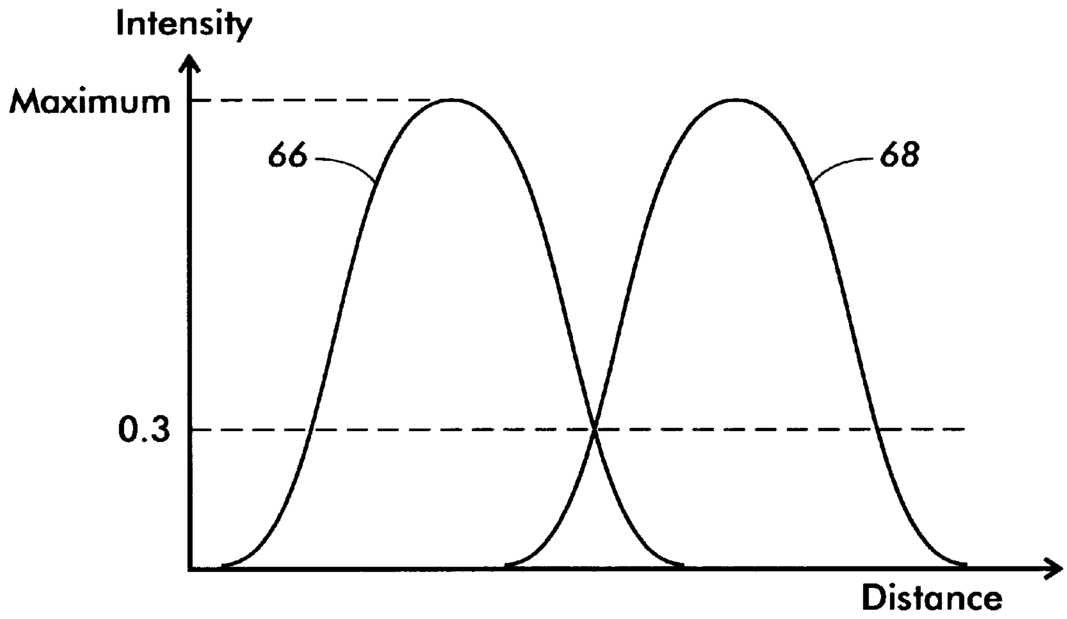
FIG. 15 shows the overlap between the intensity distributions of the two light beams creating two adjacent pixels occur at three tenth (3/10) of the maximum intensity.
Figure 16:
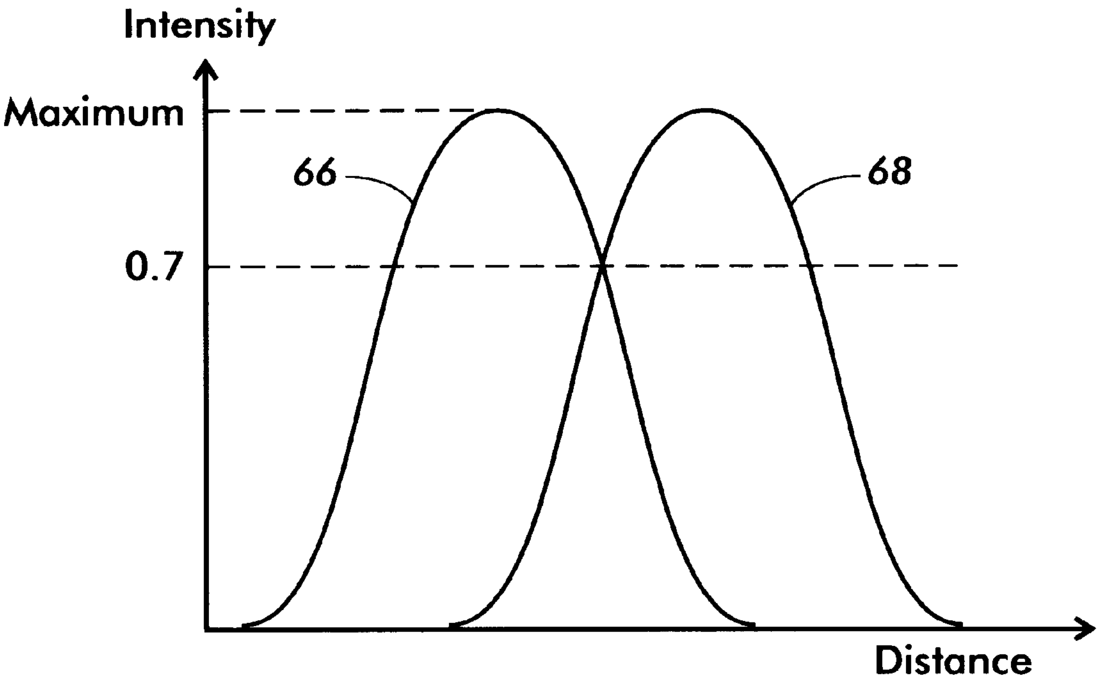
FIG. 16 shows the overlap between the intensity distributions of the two light beams creating two adjacent pixels occur at seven tenths (7/10) of the maximum intensity.

Referring to FIGS. 13 and 14, the overlap between the intensity distributions of the two light beams creating two adjacent pixels can be selected from one tenth (1/10) of the maximum intensity to nine tenths (9/10) of the maximum intensity as shown in the respective Figures. However, referring to FIGS. 15 and 16, for the preferred embodiment of this invention the overlap between the intensity distributions of the two light beams creating two adjacent pixels can be selected from three tenth (3/10) of the maximum intensity to seven tenths (7/10) of the maximum intensity as shown in the respective Figures.

It should be noted that the size of pixels are independent of the exposure overlap. The size of pixels are defined as the full width of the intensity distribution at the intensity level required to discharge a photoreceptor.

It should be noted that different variation of VCSEL arrangement can replace the VCSEL arrangement of this invention. For example, the VCSELs can be arranged to be all on one line or they can be arranged to form a staggered matrix.

It should also be noted that the VCSEL light bar of this invention can be replaced by any light bar which has a slowly diverging light beam. This type of light bar will have a characteristic which will produce a light beam in which the Full Width of each light beam at Half of its Maximum intensity (FWHM) at the light source is greater than 2.5 micron in any direction on a plane which is generally perpendicular to the axis of the light beam.

What is claimed is:

1. A printing system comprising:

a medium;

a plurality of light emitting elements emitting a plurality of light beams along a path to said medium;

the path consisting said plurality of light beams;

each of said plurality of light beams on the path to said medium having a substantially circular cross section and a Gaussian intensity distribution;

said plurality of light beams generating a plurality of exposures on a line on said medium and a plurality of pixels on the same line on said medium;

said plurality of exposures being aligned on said line on said medium;

any two adjacent exposures of said plurality of exposures partially overlapping each other on the same line on said medium;

each of said pixels being located in one of said plurality of exposures;

each of said plurality of light beams generating only one of said plurality of exposures and its corresponding pixel; and said plurality of light emitting elements being located at a given distance from said medium for creating a substantially circular pixel with a pixel size corresponding to a given printing resolution.

2. The printing system recited in claim 1, wherein said exposures' overlap occur in a range from one tenth (1/10) of maximum intensity of each light beam at exposure time to nine tenths (9/10) of maximum intensity of each light beam at exposure time.

3. The printing system recited in claim 1 wherein the pixel size is at its maximum when printing at a resolution of 300 dots per inch.

4. The printing system recited in claim 1 wherein said light source is a vertical cavity surface emitting laser array.

5. The printing system recited in claim 4, wherein said vertical cavity surface emitting laser array emits light beams having Gaussian intensity distribution when current applied to said light emitting elements is less than a given current and emits multi-mode light beams when current applied to said light emitting elements is greater than the given current, each one of said plurality of light emitting elements of said vertical cavity surface emitting laser array receives a current less than said given current.

6. The printing system recited in claim 1, wherein said plurality of light emitting elements are light sources which produce light beams in which a Full Width of each light beam at Half of a Maximum intensity of the light beam at the light source is greater than 2.5 micron in any direction on a plane which is substantially perpendicular to an axis of the light beam.

* * * * *